United States Patent
Heelan

(10) Patent No.: US 10,795,043 B2
(45) Date of Patent: Oct. 6, 2020

(54) TOWABLE ELECTROMAGNETIC SOURCE EQUIPMENT

(71) Applicant: PGS Geophysical AS, Oslo (NO)

(72) Inventor: Philip Heelan, Oslo (NO)

(73) Assignee: PGS Geophysical AS, Oslo (NO)

( * ) Notice: Subject to any disclaimer, the term of this patent is extended or adjusted under 35 U.S.C. 154(b) by 148 days.

(21) Appl. No.: 15/896,305

(22) Filed: Feb. 14, 2018

(65) Prior Publication Data

US 2018/0246245 A1 Aug. 30, 2018

Related U.S. Application Data

(60) Provisional application No. 62/464,438, filed on Feb. 28, 2017.

(51) Int. Cl.
- *G01V 3/17* (2006.01)
- *B63B 21/66* (2006.01)
- *G01V 11/00* (2006.01)
- *G01V 3/08* (2006.01)

(52) U.S. Cl.
CPC .............. *G01V 3/17* (2013.01); *B63B 21/66* (2013.01); *G01V 3/083* (2013.01); *G01V 11/002* (2013.01); *B63B 2211/02* (2013.01); *G01V 2003/084* (2013.01)

(58) Field of Classification Search
CPC . G01V 3/15; G01V 3/165; G01V 3/17; G01V 2001/207; B63B 21/66; B63B 2211/02
USPC ................................................ 324/334, 365
See application file for complete search history.

(56) References Cited

U.S. PATENT DOCUMENTS

| | | | |
|---|---|---|---|
| 6,590,831 B1 * | 7/2003 | Bennett | B63B 21/66 367/16 |
| 7,191,063 B2 | 3/2007 | Tompkins | |
| 7,457,193 B2 | 11/2008 | Pramik | |
| 7,683,625 B2 * | 3/2010 | Milne | G01V 3/12 324/365 |
| 7,737,698 B2 * | 6/2010 | Tenghamn | G01V 3/083 324/347 |

(Continued)

FOREIGN PATENT DOCUMENTS

GB 2499397 8/2013

OTHER PUBLICATIONS

Extended European Search Report for related European Application No. 18158690.0, dated Dec. 6, 2018 (14 pgs).

(Continued)

*Primary Examiner* — Steven L Yeninas

(57) ABSTRACT

A marine survey system can include a first cable including a first end configured to be coupled to a direct current (DC) power supply on a marine survey vessel and a support module coupled to a second end of the first cable and configured to receive power therefrom. A first electrode of towable electromagnetic (EM) source equipment can be coupled to the support module and configured to receive power therefrom. A depth control device can be coupled to the first electrode and configured to control a depth of the first electrode. A first end of a second cable can be coupled to the support module and configured to receive power therefrom. A second electrode of the towable EM source equipment can be coupled to a second end of the second cable and configured to receive power therefrom.

21 Claims, 10 Drawing Sheets

(56) References Cited

U.S. PATENT DOCUMENTS

| | | |
|---|---|---|
| 7,834,632 B2 | 11/2010 | Tenghamn et al. |
| 8,008,921 B2 | 8/2011 | Alumbaugh et al. |
| 8,113,135 B2* | 2/2012 | Catherin ............... B63B 21/66 |
| | | 114/244 |
| 8,183,868 B2 | 5/2012 | Summerfield et al. |
| 8,816,690 B2* | 8/2014 | Sudow .................. G01V 1/201 |
| | | 324/365 |
| 8,857,360 B2* | 10/2014 | Rinnan ............... G01V 1/3826 |
| | | 114/245 |
| 8,896,314 B2* | 11/2014 | Sudow .................... G01V 3/12 |
| | | 324/365 |
| 9,081,106 B2 | 7/2015 | Peppe et al. |
| 9,389,328 B2 | 7/2016 | Schneider et al. |
| 2006/0038570 A1 | 2/2006 | Constable |
| 2006/0202697 A1* | 9/2006 | Sodal .................... G01V 3/083 |
| | | 324/332 |
| 2006/0227657 A1* | 10/2006 | Tveide ................... B63B 21/56 |
| | | 367/16 |
| 2007/0145980 A1 | 6/2007 | Conti et al. |
| 2010/0045295 A1 | 2/2010 | Mittet et al. |
| 2010/0250140 A1* | 9/2010 | Constable ............. G01V 3/083 |
| | | 702/7 |
| 2013/0093426 A1* | 4/2013 | Peppe ..................... G01V 3/00 |
| | | 324/365 |
| 2013/0300420 A1* | 11/2013 | Juhasz .................. G01V 3/083 |
| | | 324/365 |
| 2014/0167768 A1 | 6/2014 | Linfoot et al. |
| 2014/0185411 A1* | 7/2014 | Voldsbekk ............... G01V 1/38 |
| | | 367/20 |
| 2014/0253129 A1 | 9/2014 | Heelan et al. |
| 2014/0253132 A1* | 9/2014 | Juhasz .................. G01V 3/083 |
| | | 324/365 |
| 2016/0041291 A1* | 2/2016 | Zhdanov ............... G01V 3/08 |
| | | 324/335 |
| 2016/0109609 A1* | 4/2016 | Bjornemo ............. G01V 3/083 |
| | | 324/365 |

OTHER PUBLICATIONS

Partial European Search Report for related European Application No. 18158690.0, dated Aug. 6, 2018 (17 pgs).

* cited by examiner

TOWABLE ELECTROMAGNETIC SOURCE EQUIPMENT

CROSS-REFERENCE TO RELATED APPLICATIONS

This application claims priority to U.S. Provisional Application 62/464,438, filed Feb. 28, 2017, which is incorporated by reference.

BACKGROUND

In the past few decades, the petroleum industry has invested heavily in the development of marine survey techniques that yield knowledge of subterranean formations beneath a body of water in order to find and extract valuable mineral resources, such as oil. High-resolution images of a subterranean formation are helpful for quantitative interpretation and improved reservoir monitoring. For a typical marine survey, a marine survey vessel tows one or more sources below the water surface and over a subterranean formation to be surveyed for mineral deposits. Receivers may be located on or near the seafloor, on one or more streamers towed by the marine survey vessel, or on one or more streamers towed by another vessel. The marine survey vessel typically contains marine survey equipment, such as navigation control, source control, receiver control, and recording equipment. The source control may cause the one or more sources, which can be air guns, marine vibrators, electromagnetic sources, etc., to produce signals at selected times. For example, each signal is essentially a wave called a wavefield that travels down through the water and into the subterranean formation. At each interface between different types of rock, a portion of the wavefield may be refracted, and another portion may be reflected, which may include some scattering, back toward the body of water to propagate toward the water surface. The receivers thereby measure a wavefield that was initiated by the actuation of the source. In another example, an electric current is injected into the water and the resulting electromagnetic field in the water is measured by the receivers. The resulting electromagnetic field can be indicative of mineral deposits.

DETAILED DESCRIPTION

Figure 1:
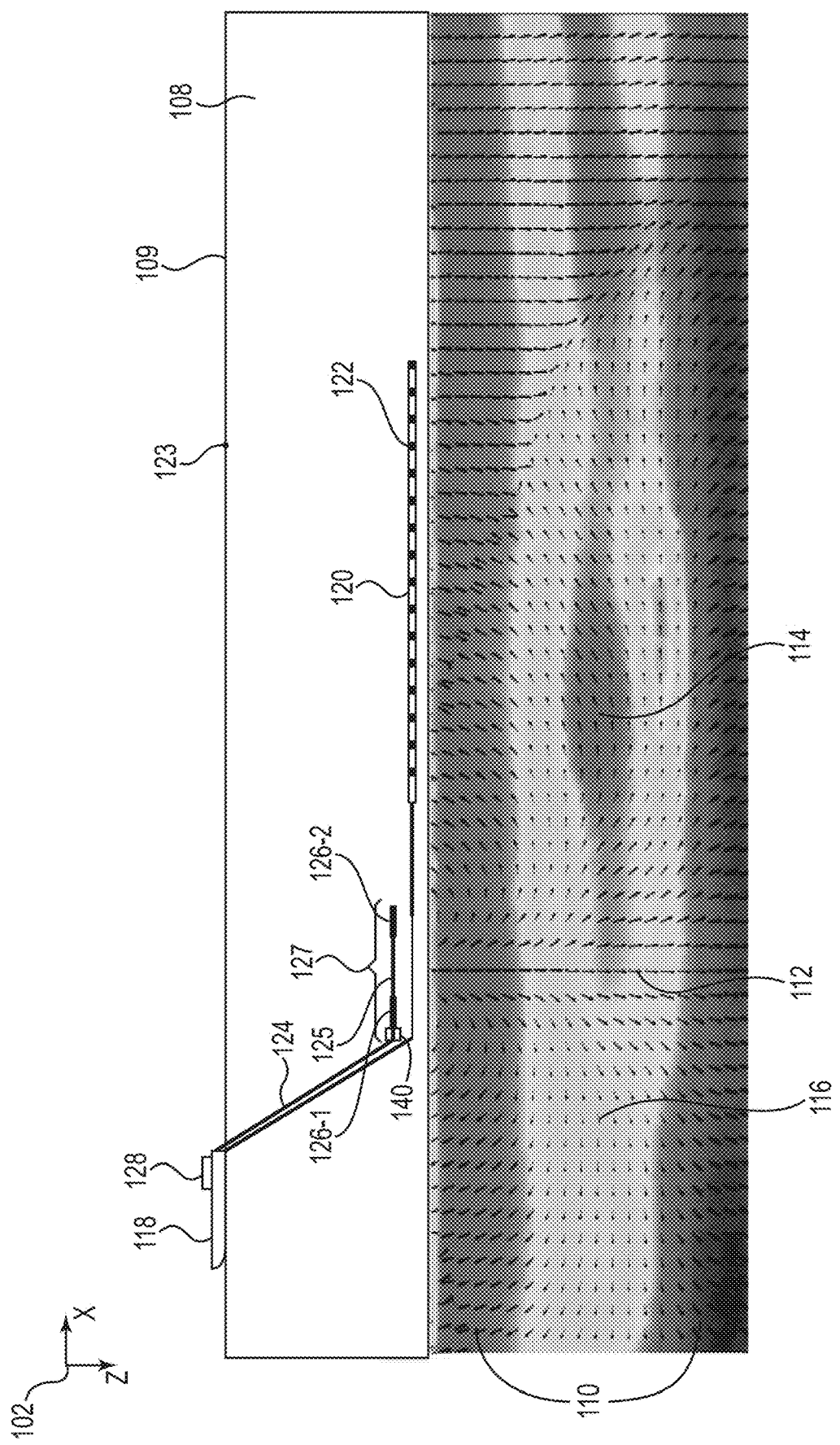
FIG. 1 is an xz-plane view of a towed electromagnetic (EM) survey system.

This disclosure is related generally to the field of marine surveying. Marine surveying can include, for example, seismic surveying or towed electromagnetic (EM) surveying, among others. For example, this disclosure may have applications in towed EM surveying. In towed EM surveying, one or more EM sources may be towed and are used to inject an electric current into a water volume. EM receivers may be towed concurrently with the EM source. The EM receivers detect changes in amount of electric charge in the water volume thereby collecting marine EM survey data. The marine survey data can be indicative of a subsurface formation, which can be useful in generating images of the subsurface formation or in the discovery and/or extraction of hydrocarbons from the subsurface formation. An EM system may work more effectively in water, such as sea water, that includes dissolved ions, which improve electrical conductivity of the water.

A large amount of power is required by towable EM source equipment in order to inject an electric current into a water volume. For example, towable EM source equipment can require 300 kilowatts (kW) in order to inject a 1500 ampere (A) electric current at 200 volts (V) in to a water volume. A power supply, such as a power supply onboard a marine survey vessel that is towing the towable EM source equipment, can power the towable EM source equipment. The power supply can power systems and components of the marine survey vessel as well as the towable EM source equipment. In some instances, the power supply can generate excess power to ensure that more than sufficient power is available. The excess power can be distributed to other systems and components of towable EM source equipment.

Embodiments according to the present disclosure include towable EM source equipment including a support module that can distribute power, such as the excess power described above, to other systems and components of the towable EM source equipment. In at least one embodiment, the support module can distribute power to a depth control device of the towable EM source equipment. The depth control device can change the depth of the towable EM source equipment and maintain a particular depth of the towable EM source equipment. Some previous approaches, such as that illustrated in FIG. 2, include towable EM source equipment that is tethered to surface floats such that the depth at which the towable EM source equipment can be towed is limited to a depth near a water surface. In contrast, at least one embodiment includes towable EM source equipment that includes a support module coupled to an electrode of the towable EM source equipment that can be towed at deeper depths. The support module can include a depth control device such that the towable EM source equipment can be towed at deeper depths at faster vessel speeds, such as those associated with marine seismic surveys. Towing the towable EM source equipment at a deeper depth can be advantageous when towing marine seismic survey equipment concurrently with towable EM source equipment. The deeper depth can prevent entanglement of cables associated with the towable EM source equipment with cables associated with the marine seismic survey equipment.

It is to be understood the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the word "may" is used throughout this application in a permissive sense (having the potential to, being able to), not in a mandatory sense (must). The term "include," and derivations thereof, mean "including, but not limited to." The term "coupled" means directly or indirectly connected.

The figures herein follow a numbering convention in which the first digit or digits correspond to the drawing figure number and the remaining digits identify an element or component in the drawing. Similar elements or components between different figures may be identified by the use of similar digits. For example, 326 may reference element "26" in FIG. 3, and a similar element may be referenced as 426 in FIG. 4. Analogous elements within a Figure may be referenced with a hyphen and extra numeral or letter. See, for example, elements 326-1, and 326-2 in FIG. 3. Such analogous elements may be generally referenced without the hyphen and extra numeral or letter. For example, elements 326-1 and 326-2 may be collectively referenced as 326. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 is an xz-plane 102 view of a towed electromagnetic (EM) survey system. Electric current can be injected into a water volume 108 by towable EM source equipment 127. The towable EM source equipment 127 can include some or all of a support module 140, a forward electrode 126-1, an aft electrode 126-2, a light cable 125. The towable EM source equipment 127 can include additional components that are not illustrated in FIG. 1. A first end of the light cable 125 can be coupled to the support module 140 and/or to the forward electrode 126-1. A second end of the light cable 125 can be coupled to the aft electrode 126-2. The light cable 125 can be neutrally buoyant in water such that the aft electrode 126-2 is level with the forward electrode 126-1. Because the light cable 125 is neutrally buoyant, a horizontal profile from the forward electrode 126-1 to the aft electrode 126-2 can be maintained while not affecting a depth of the forward electrode 126-1. In at least one embodiment, the aft electrode 126-2 and the forward electrode 126-1 are kept approximately 800 m apart in the in-line direction. The forward electrode 126-1 can assume a relatively fixed layback (depth and distance) with respect to the marine survey vessel 118 and the aft electrode 126-2 can be maintained at a relatively fixed distance behind the forward electrode 126-1 because of drag forces from being towed. The support module 140 can be coupled to the marine survey vessel 118 via a heavy cable 124. Changing the depth of the forward electrode 126-1 can be achieved by changing the deployed length of the heavy cable 124 because the heavy cable 124 sinks in water. The light cable 125 can cause changes in the depth or lateral position of the forward electrode 126-1 to be transmitted to the aft electrode 126-2, which can also be neutrally buoyant. The light cable 125 can include conductors, which can be metal, such as aluminum. The towable EM source equipment can include one or more EM sources. For example, the forward electrode 126-1 and the aft electrode 126-2 can be an EM source, such as a dipole source. Because the forward electrode 126-1 and the aft electrode 126-2 are maintained at a relatively fixed distance apart, the forward electrode 126-1 and the aft electrode 126-2 can be a horizontal dipole source.

FIG. 1 shows an example of a marine survey vessel 118 equipped to carry out towed EM surveys. Although not specifically illustrated, the marine survey vessel 118 can be configured to perform both towed EM surveys and marine seismic surveys. The marine survey vessel 118 can tow one or more streamers 120 (shown as one streamer for ease of illustration) below the water surface 109. The streamers 120 can be long cables containing power and data-transmission lines, such as electrical, optical fiber, etc., to which receivers may be coupled. In a towed EM survey, the streamers 120 can make use of EM receivers, such as the EM receiver 122, which detect changes in EM energy within the water volume 108. In marine seismic surveys, the streamers can make use of seismic receivers that include a motion sensor, such as a geophone sensor, that detects particle displacement within the water volume 108 by detecting particle motion variation, such as velocities or accelerations, and a hydrophone that detects variations in pressure. In another type of marine survey, receivers on one or more streamers can include EM receivers and seismic receives such that the streamers can be used to detect both changes in EM energy and seismic energy.

The streamers 120 and the marine survey vessel 118 can include sensing electronics and data-processing facilities that allow receiver readings to be correlated with absolute positions on the sea surface and absolute three-dimensional positions with respect to a three-dimensional coordinate system. In FIG. 1, the receivers along the streamers are shown to lie below the sea surface 109, with the receiver positions correlated with overlying surface positions, such as a position 123 near the water surface 109 correlated with the position of receiver 122. The marine survey vessel 118 can tow towable EM source equipment 127, which can include the forward electrode 126-1 and the aft electrode 126-2 that inject an electric current into the water volume 108. Although not specifically illustrated, for some surveys, the streamers 120 can be towed by one vessel, such as the marine survey vessel 118, and the towable EM source equipment 127 can be towed by a different vessel.

A power supply 128 can be onboard the marine survey vessel 118. The power supply 128 can provide power to various systems onboard the marine survey vessel 118. The power supply 128 can be a direct current (DC) power supply. The power supply 128 can be configured to generate switched DC power. As used herein, "switched DC power" refers to DC power that switches polarity at a particular frequency. The power supply 128 can be coupled to the towable EM source equipment 127. As illustrated in FIG. 1, the towable EM source equipment 127 includes a support module 140. The support module 140 can receive power from the power supply 128. The support module 140 can be coupled to the forward electrode 126-1. The support module 140 can be coupled to the aft electrode 126-2 via the light cable 125. The support module 140 can distribute power, such as switched DC power, from the power supply 128 to the forward electrode 126-1, to the aft electrode 126-2, and to a device other than the forward electrode 126-1 or the aft electrode 126-2. The support module 140 is discussed further in association with FIGS. 3-10 below.

Although not illustrated in FIG. 1, the support module 140 can include a depth control device. The support module 140 can include a depth sensor that is in communication with the depth control device. The depth control device can be a horizontal hydroplane coupled to the support module 140. The support module can include a mechanism, such as an actuator, motor, or electromechanical depressor, to change an angle of the horizontal hydroplane relative to the support module 140. The mechanism can receive power from the support module 140. The horizontal hydroplane is discussed further in association with FIGS. 7-9B below.

As illustrated in FIG. 1, the power supply 128 can be coupled to the support module 140 via the heavy cable 124. A first end of the heavy cable 124 can be coupled to the power supply 128 and a second end of the heavy cable 124 can be coupled to the support module 140. The heavy cable 124, in contrast to the light cable 125, may not be neutrally buoyant in water. The heavy cable 124 can include conductors comprising material(s) that are negatively buoyant such that the heavy cable 124 sinks in water. The heavy cable 124 can provide coarse control of depth of the towable EM source equipment 127. For example, the heavy cable 124 can include four conductors, which can comprise copper, such that the mass of the heavy cable is 800 kilograms (approximately 1800 pounds). As discussed below in association with FIGS. 7, 8, 9A, 9B, and 9C a horizontal hydroplane can be coupled to the forward electrode 126-1 to provide fine depth control of the towable EM source equipment 127.

The switched DC power can be transmitted from the power supply 128 to the towable EM source equipment 127 via the heavy cable 124. For example, DC power can be polarized such that the forward electrode 126-1 is positively charged and the aft electrode 126-2 is negatively charged. The electric current injected into the water volume 108 would flow from the forward electrode 126-1 to the aft electrode 126-2. Next, the polarity of the DC power switches such that the forward electrode 126-1 is negatively charged and the aft electrode 126-2 is positively charged. The electric current injected into the water volume 108 would then flow from the aft electrode 126-2 to the forward electrode 126-1.

Processing and analysis of data from injecting the electric current can be performed in order to help characterize the structures and distributions of features and materials underlying the surface of the earth. Switching the polarity of an EM source, such as the towable EM source equipment 127, when the EM source is positioned over a hydrocarbon source, such as an oil reservoir, can also switch the polarity of the hydrocarbon source. Charge is deposited on the side of the hydrocarbon source that is closest to the EM source. The deposited charge can be result from charge moving through the structure of the hydrocarbon source. However, it takes time for the charge to move through the structure of the hydrocarbon source. EM receivers on a streamer, can detect changes in charge and rates of changes in charge in the water volume 108 and the hydrocarbon source. The detected changes in charge can be in the form of changes in an electromagnetic field. An electric field can be measured in units of volts/meter. Geological models can be used to simulate EM fields resulting from switching the polarity of an EM source above the subsurface that does not contain a hydrocarbon source. Other geological models can be used to simulate EM fields resulting from switching the polarity of an EM source above the subsurface that does contain a hydrocarbon source. By comparing marine survey data from an EM survey using the EM source to the geological models, the likelihood of a hydrocarbon source being located in the surveyed subsurface can be determined.

An EM source, such as the towable EM source equipment 127, can be used with various frequencies (for example, from 0 hertz (Hz) to 100 Hz) of switched DC power. Low frequencies can promote penetration of an EM field resulting from the electric current into the water volume 108; however, the resolution of the marine survey data may be low. In contrast, high frequencies can yield high resolution marine survey data but the EM field may not penetrate the subsurface as much as the low frequencies. It can be beneficial to use frequencies in between the low and high frequencies to get a combination of deep penetration into the subsurface and good resolution of the marine survey data.

FIG. 1 shows energy flux 112 and 116 (displayed as arrows) resulting from the electric current injected by the towable EM source equipment 127 and a subsurface resistivity profile 110 from an inversion (indicated by the shading). A change in the resistivity profile may indicate a change in the geology of the subsurface. For example, the darker shading 114 surrounded by lighter shading may be indicative of hydrocarbons in the subsurface.

Although not specifically illustrated in FIG. 1, the marine survey vessel 118 can tow marine seismic survey equipment concurrently with the towable EM source equipment 127. The marine seismic survey equipment can include, but is not limited to, seismic sources and streamers. As described above, the streamer for a marine seismic survey can be the same or different than the streamer 120. A seismic source can emit an expanding, spherical acoustic signal, which can be analogized to semicircles of increasing radius centered at the seismic source, representing a down-going wavefield, following an acoustic signal emitted by the seismic source. The outward and downward expanding down-going wavefield may eventually reach a solid surface, such as the seafloor, at which point the outward and downward expanding down-going wavefield may partially scatter, may partially reflect back toward the streamer, and may partially refract downward into a solid volume, such as the subsurface, becoming elastic acoustic signals within the solid volume.

Figure 2:
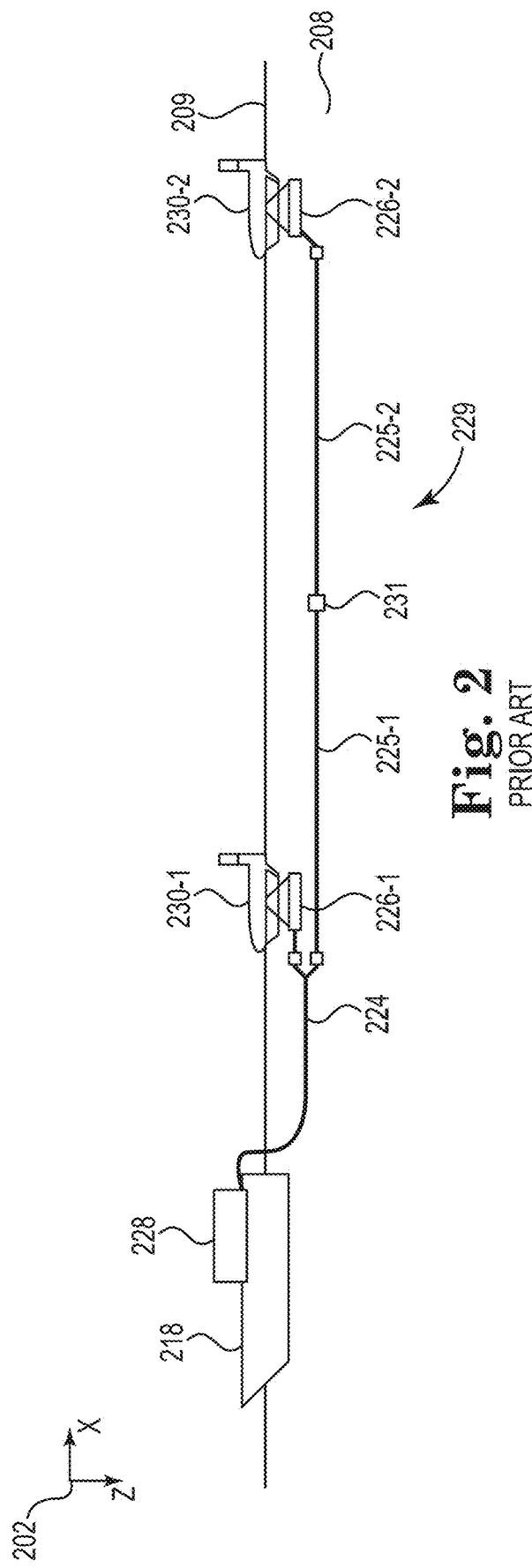
FIG. 2 is an xz-plane view of a previous approach to towable EM source equipment.

FIG. 2 is an xz-plane 202 view of a previous approach to towable EM source equipment. The x-direction can be referred as the in-line direction. In some previous approaches, the towable EM source equipment 229 may include a forward electrode 226-1 tethered to a first surface float 230-1 and an aft electrode 226-2 tethered to a second surface float 230-2. The surface floats 230-1 and 230-2 may be positioned on or near the water surface 209 while the forward electrode 226-1 and the aft electrode 226-2 are positioned in the water volume 208. Tethering the forward electrode 226-1 and the aft electrode 226-2 to the surface floats 230 limits the depth at which the forward and aft electrodes 226 may be towed. For example, the depth of the forward electrode 226-1 and the aft electrode 226-2 may be no more than 10 meters (m). A power supply 228 onboard the marine survey vessel 218 can be coupled to the forward electrode 226-1 and can be coupled to the aft electrode 226-2 via a light cable including a first light cable section 225-1 coupled to a second light cable section 225-2 via a light cable interconnect 231. The forward electrode 226-1 and the aft electrode 226-2 are interconnected via water, which allows for electrical conduction therebetween. The light cable interconnect 231 may provide a physical coupling and an electrical coupling of the light cable sections 225-1 and 225-2. Each of the light cable sections 225-1 and 225-2 may be approximately 400 m long such that the in-line distance between the electrodes 226 is approximately 800 m. The power supply 228 onboard the marine survey vessel 218 can be directly coupled to the forward electrode 226-1 and the first light cable section 225-1 via the heavy cable 224, without any intervening components. As discussed below in association with FIG. 3, some previous approaches, such as that illustrated in FIG. 2, are not compatible with towing and operating marine seismic survey equipment concurrently with the towable EM source equipment 229.

Figure 3:
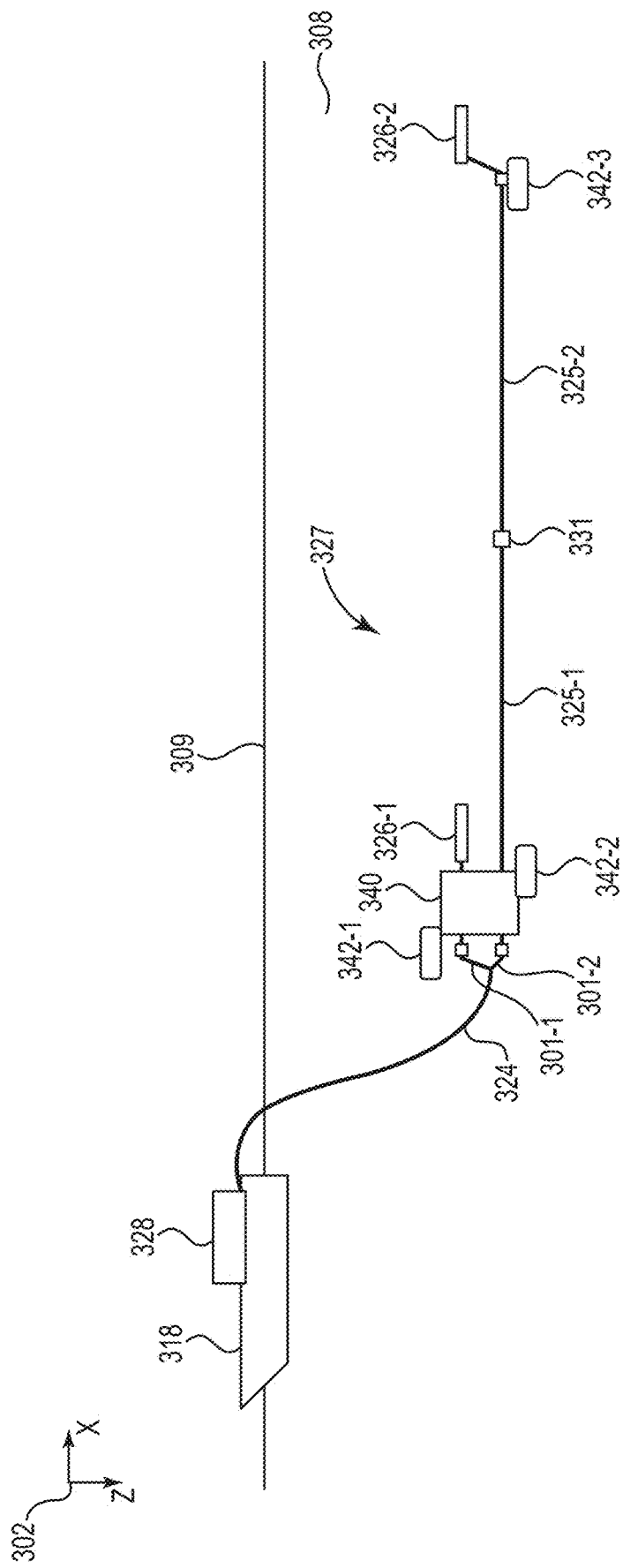
FIG. 3 is an xz-plane view of an example of towable EM source equipment including a support module.

FIG. 3 is an xz-plane 302 view of an example of towable EM source equipment 327 including a support module 340. In contrast to some previous approaches, such as that illustrated in FIG. 2, the towable EM source equipment 327 in FIG. 3 can include a forward electrode 326-1 and an aft electrode 326-2 that are not tethered to surface floats. Thus, the towable EM source equipment 327 can be positioned and towed at a deeper depth than previous approaches that include surface floats. For example, the towable EM source equipment 327 can be towed at a depth of approximately 100 m as compared to a depth of 10 m of some previous approaches. In at least one embodiment, the towable EM source equipment 327 can be towed as deep as 500 m.

A benefit of towing towable EM source equipment, such as the towable EM source equipment 327, at a deeper depth can be that the towable EM source equipment 327 can be used in a 3D seismic EM survey. A 3D seismic EM survey can use marine seismic surveying techniques and equipment as well as towed EM surveying techniques and equipment. In a 3D seismic EM survey, the marine seismic survey equipment (not shown in FIG. 3), which can include a seismic source and seismic receivers, can be towed concurrently with EM survey equipment, which can include towable EM source equipment and EM receivers (for example, an EM receiver array). Both the marine seismic survey equipment and the towable EM source equipment 327 can be towed by a single marine survey vessel, such as the marine survey vessel 318; however, embodiments are not so limited. The marine seismic survey equipment can be towed at a depth near the water surface 309 above the towable EM source equipment 327. For example, the marine seismic survey equipment can be towed at a depth of 25 m. Tethering towable EM source equipment to surface floats can limit the depth at which the towable EM source equipment can be towed. For example, if the tether between an electrode and a corresponding surface float is 10 m long, then the towable EM source equipment can be towed at a depth no deeper than 10 m. At such a shallow depth (for example, 10 m) the towable EM source equipment would get entangled with marine seismic survey equipment that is towed concurrently with the towable EM source equipment. Such potential entanglement is another reason why it is advantageous to avoid the use of surface floats according to at least one embodiment of the present disclosure. Thus, it is important to tow the towable EM source equipment 327 at a deeper depth than the marine seismic survey equipment such that the towable EM source equipment 327 and the marine seismic survey equipment do not interfere with each other. For example, the towable EM source equipment 327 can be towed at a depth of 100 m, which is four times deeper than the marine seismic survey equipment and ten times deeper than the towable EM source equipment 229 illustrated in FIG. 2.

Another benefit of at least one embodiment can be that the towable EM source equipment, such as the towable EM source equipment 327, can towed at faster speeds than some previous approaches. Some previous approaches may not tow both towable EM source equipment and EM receivers. For example, in some previous approaches EM receivers may be deployed individually over the seafloor in a node-based system. Towable EM source equipment may be towed almost directly above the EM receivers and the seafloor. Although the towable EM source equipment may be at a depth of 2000 to 3000 m, the speed at which the towable EM source equipment may be towed is limited to 1 to 1.5 knots (kn).

When towable EM source equipment is towed at a depth of 2000 to 3000 m, the hydrodynamic drag on the towable EM source equipment can cause the towable EM source equipment to rise. Hydrodynamic drag may cause the towable EM source equipment to travel slower than the vehicle towing the towable EM source equipment. Because the towable EM source equipment is traveling at a slower seed than the marine survey vessel, the in-line distance between the towable EM source equipment and the marine survey vessel will increase. If the length of cable coupling the towable EM source equipment to the marine survey vessel is not changed, then the layback of the towable EM source equipment relative to the marine survey vessel will be constant. As used herein, "layback" refers to an angular distance between the towable EM source equipment and the marine survey vessel towing the towable EM source equipment. Layback can be analogized to the hypotenuse of the triangle comprising the in-line distance between the towable EM source equipment and the marine survey vessel and the depth of the towable EM source equipment relative to the marine survey vessel. When the layback is constant, the depth of the towable EM source equipment will decrease as the in-line distance increases. To minimize this rising effect, the marine survey vessel can tow the towable EM source equipment at slow speeds such that the hydrodynamic drag does not cause a significant decrease of the speed of the towable EM source equipment. For example, in some previous approaches a marine survey vessel may not tow towable EM source equipment at speeds faster than 1 to 1.5 kn. Thus, some previous approaches must tow towable EM source equipment very slowly to tow towable EM source equipment at a particular depth, such as a depth directly above the seafloor, and to maintain the particular depth. This, in turn, increases the time necessary to complete an EM survey of area, which can cover several square kilometers. The already increased time is compounded by the fact that a node-based system requires the EM receivers to be retrieved from the seafloor and then redeployed to survey another portion of an area to be surveyed.

In contrast to some previous approaches, at least one embodiment includes towable EM source equipment, such as the towable EM source equipment 327, that can be towed at 4 to 4.5 kn. Because EM receivers can be towed with the towable EM source equipment 327, there is no need to stop, pause, or slow down an EM survey using the towable EM source equipment 327 in order to retrieve equipment. Marine seismic survey equipment can be towed at 4 to 4.5 kn. Thus, the towable EM source equipment 327 can be towed at a vessel speed associated with a marine seismic survey. This can be advantageous when the towable EM source equipment 327 is towed concurrently with marine seismic survey equipment.

Each of the light cable sections 325-1 and 325-2 can be approximately 400 m long such that the in-line distance between the electrodes 326 is approximately 800 m. Streamers (not shown in FIG. 3), such as the streamers 120 illustrated in FIG. 1, can be as long as or longer than the towable EM source equipment 327. For example, the streamers can be eight to nine kilometers (km) long. Because the towable EM source equipment 327 and the streamers can be long, there is a potential for the cables of the towable EM source equipment 327 and streamers to become entangled if the streamers are not separated from the towable EM source equipment 327 by several meters. The towable EM source equipment 327 can be towed at a deeper depth than marine seismic survey equipment. In at least one embodiment, the towable EM source equipment 327 can be towed at a depth of approximately 100 m as compared to marine seismic survey equipment being towed at a depth of 25 m.

The power supply 328 onboard the marine survey vessel 318 can generate a large amount of switched DC power. For example, a particular power supply 328 can generate 400 kW of switched DC power. However, the towable EM source equipment 327 may only utilize a portion of the switched DC power generated by the power supply 328. In at least one embodiment, the towable EM source equipment 327 can require at least 180 kW of switched DC power to function properly. However, the power needed to generate a particular current can vary, as it depends on salinity of the water, dimensions of the electrodes, and working state of the electrodes, among other factors. The power supply 328 can be over-designed so as to cope with such possible changes. For example, the towable EM source equipment 327 can be configured to inject a 1500 A electric current into the water volume 308 and the output voltage of the EM source can be 240 volts (V). As a result, the output power of the towable EM source equipment 327 can be 360 kilowatts (kW) (1500 A times 240 V). In the example where the power supply 328 generates 400 kW of switched DC power, there may be 40 kW of switched DC power remaining (400 kW-360 kW). At least one embodiment of the present disclosure takes advantage of this remaining switched DC power, which may also be referred to as power overhead, to provide power to a device, such as another system and component of the towable EM source equipment 327, other than the forward electrode 326-1 and the aft electrode 326-2. The device can be at least one of the group of devices including a depth control device, a position control device, a position indicator, a hydroplane, and a sensor.

As illustrated in FIG. 3, at least one embodiment can include a support module 340 coupled to the forward electrode 326-1 of the towable EM source equipment 327. The aft electrode 326-2 can be coupled to the support module 340 via the first light cable section 325-1, the second light cable section 325-2, and the light cable interconnect 331 in between. In at least one embodiment, the forward electrode 326-1 and the aft electrode 326-2 can each be cylindrical. By way of example, the forward electrode 326-1 and the aft electrode 326-2 can each be approximately 3.65 m long, and 710 millimeters in diameter, however embodiments are not so limited.

The support module 340 can be coupled to the power supply 328 via the heavy cable 324. Specifically, the heavy cable 324 can be a bundled assembly that includes multiple conductors, such as four conductors, bundled together. The heavy cable 324 can be split into a first sub-cable 301-1 and a second sub-cable 301-2 that each includes fewer conductors than the heavy cable 324. For example, each sub-cable 301 can include two conductors from the heavy cable 324. As described in more detail with respect to FIG. 7, the first connector 301-1 can be coupled to the support module 340 to provide power to the forward electrode 326-1 and the second connector 301-2 can be coupled to the support module 340 to provide power to the aft electrode 326-2 via the first light cable section 325-1, the second light cable section 325-2, and the light cable interconnect 331 in between. The support module 340 can distribute switched DC power generated by the power supply 328 to the forward electrode 326-1 and the aft electrode 326-2. The switched DC power can be used to inject an electric current into the water volume 308, such as that described above in association with FIG. 1. The support module 340 can distribute switched DC power generated by the power supply 328 to other systems and components of the towable EM source equipment 327. Although not illustrated in FIG. 3, the support module 340 can include a depth control device, such as a horizontal hydroplane coupled to the support module 340. The support module 340 can include a depth sensor that is in communication with the depth control device. The horizontal hydroplane is discussed further in association with FIGS. 7-9B below.

As illustrated in FIG. 3, the towable EM source equipment 327 can include one or more position indicators 342. As used herein, "position indicator" refers to a device that emits a signal that is indicative of the position of the device. The position indicators 342 can be, for example, transceivers, transponders, acoustic beacons, etc. Collectively, the position indicators 342 can function analogously to an ultra-short baseline (USBL) system or an inverted USBL (iUSBL) system. The term "USBL system" is used herein to generically cover both USBL and iUSBL systems. A typical USBL system can include a transceiver mounted on the marine survey vessel 318, such as on a pole under the marine survey vessel 318, and a transponder or responder on other source equipment. According to at least one embodiment of the present disclosure, the position indicators 342, functioning analogously to a USBL system, can include an additional transceiver coupled to source equipment (not specifically illustrated). The USBL system can include processing resources and memory resources configured to calculate the position of the source equipment from the ranges and bearing measured by the transceivers in the USBL system. The transceivers can emit acoustic pulses that are detected by the transponders or responders, which can reply with their own acoustic pulse. The transceiver can detect the return pulse. The time from transmission of the initial acoustic pulse until the reply can be detected and measured by the USBL system and converted into a range. The USBL system can also calculate and angle from the transceiver to the transponder or responder using, for example, phase differencing from an array of transducers in the transceiver.

At least one embodiment can include a first position indicator 342-1 coupled to the support module 340 and directed towards the marine survey vessel 318. The first position indicator 342-1, such as a transponder, can be used to determine the position of the support module 340 and the forward electrode 326-1 relative to the marine survey vessel 318 with reference to a position indicator, such as a transceiver that is not specifically illustrated, on the marine survey vessel 318. A second position indicator 342-2, such as a transceiver, can be coupled to the support module 340 and directed towards the aft electrode 326-2. The second position indicator 342-2 can be used to determine the position of the support module 340 and the forward electrode 326-1 relative to the aft electrode 326-2. A third position indicator 342-3, such as a transponder, can be coupled to the aft electrode 326-2 and directed towards the support module 340 and the forward electrode 326-1. The third position indicator 342-3 can be used to determine the position of the aft electrode 326-2 relative to the support module 340 and the forward electrode 326-1. Specifically, having determined the position of the support module 340, the second position indicator 342-2 can be used to triangulate the position of the aft electrode 326-2 with reference to the third position indicator 342-3.

The support module 340 can distribute switched DC power generated by the power supply 328 to the first position indicator 342-1, the second position indicator 342-2, and the third position indicator 342-3. The switched DC power distributed to the third position indicator 342-3 can be transmitted via the first light cable section 325-1, the second light cable section 325-2, and the light cable interconnect 331 in between. The switched DC power distributed to one or more of the position indicators 342 can be stepped down. For example, the switched DC power can be stepped down to 24 V.

In at least one embodiment, the support module 340 can include a circuit to convert switched DC power to regulated DC power, such as the circuit that is described further below in association with FIGS. 5 and 6. As used herein, "regulated DC power" refers to power derived from a constant or nearly constant DC voltage that does not periodically switch polarity. The circuit can convert switched DC power generated by the power supply 328 to regulated DC power and distribute the regulated DC power to other systems and components of the towable EM source equipment 327. In at least one embodiment, the support module 340 can distribute the regulated DC power to the first position indicator 342-1, the second position indicator 342-2, and the third position indicator 342-3. The regulated DC power distributed to the third position indicator 342-3 can be transmitted via the first light cable section 325-1, the second light cable section 325-2, and the light cable interconnect 331 in between. Although the present disclosure describes a power supply, such as the power supply 328 that generates switched DC power, embodiments are not so limited. For example, the power supply 328 can generate alternating current (AC) power.

Figure 4:
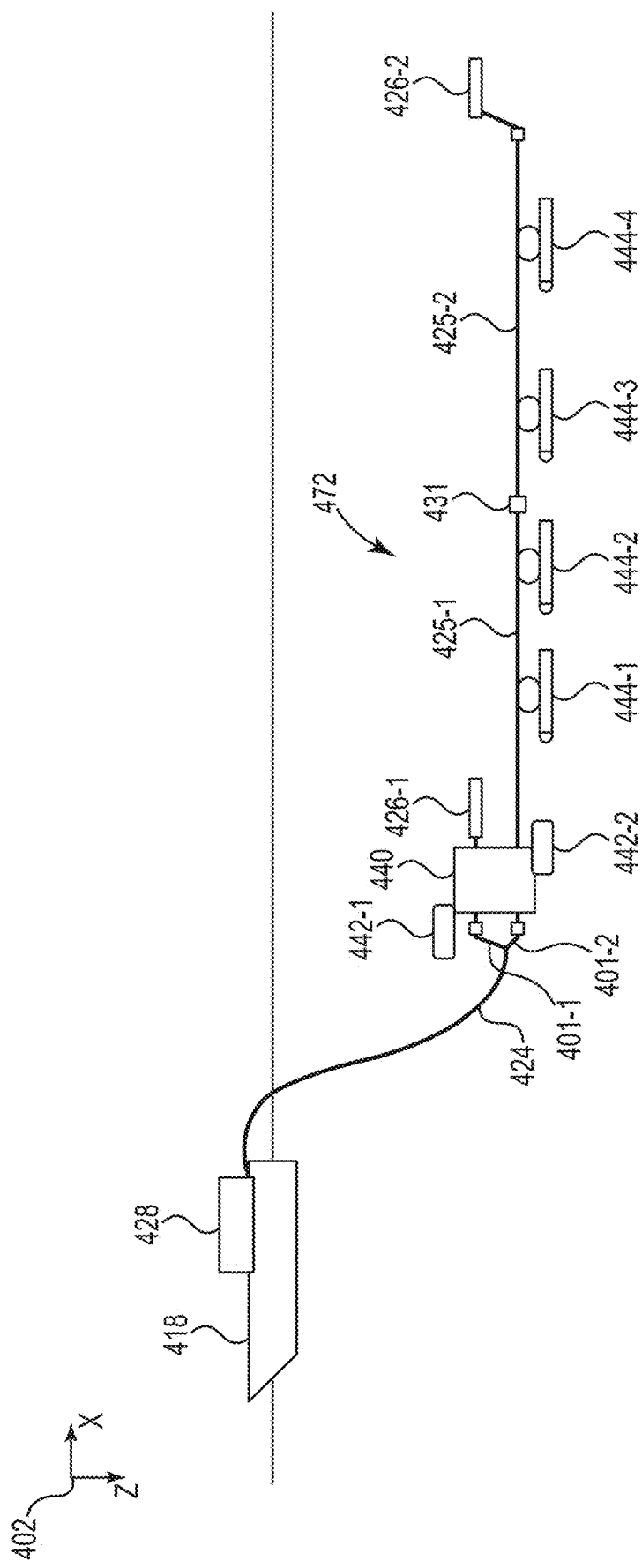
FIG. 4 is an xz-plane view of an example of towable EM source equipment including a support module and position control devices.

FIG. 4 is an xz-plane 402 view of an example of towable EM source equipment 472 including a support module 440 and position control devices 444-1, 444-2, 444-3, and 444-4. The support module 440 can be coupled to a power supply 428 on the marine survey vessel 418 via the heavy cable 424 (and the first sub-cable 401-1, and the second sub-cable 401-2). As illustrated in FIG. 4, a first position indicator 442-1 can be coupled to the support module 440 and directed towards the marine survey vessel 418. A second position indicator 442-2 can be coupled to the support module 440 and directed towards the aft electrode 426-2 and the position control devices 444. The second position indicator 442-2 can be configured to determine the position of one or more of the position control devices 444.

The example of FIG. 4 includes four position control devices 444 coupled to the first light cable section 425-1 and second light cable section 425-2. The position control devices 444 can, for example, provide control of and adjust any or all of the lateral position, the depth, or the lateral position and depth of the towable EM source equipment 472. In at least one embodiment, the position control devices 444 can provide acoustic communication to the towable EM source equipment 472. In at least embodiment, the support module 440 can distribute switched DC power generated by the power supply 428 to each of the position control devices 444. The switched DC power distributed to each of the position control devices 444 can be transmitted to each of the position control devices 444 via one or more of the first light cable section 425-1, second light cable section 425-2, and light cable interconnect 431. In at least one embodiment, the position control devices 444 can be battery powered such that the support module 440 does not distribute power to the position control devices 444.

In at least one embodiment, the support module 440 can include a circuit to convert switched DC power to regulated DC power. The support module 440 can distribute regulated DC power to each of the position control devices 444. The regulated DC power can be distributed to each of the position control devices 444 via one or more of the first light cable section 425-1 and second light cable section 425-2. The support module 440 can distribute switched DC power generated by the power supply 428 or regulated DC power to each of the position control devices 444. Although FIG. 4 illustrates four position control devices 444-1, 444-2, 444-3, and 444-4, embodiments can include any number of position control devices coupled the first light cable section 425-1 and second light cable section 425-2. Although FIG. 4 illustrates the position control devices 444 and the position indicators 442, at least one embodiment can include the position control devices 444 and not the position indicators 442. The position control devices 444 can ensure that the light cable 425 is towed flat such that the aft electrode 426-2 is level with the forward electrode 426-1. Although not illustrated in FIG. 4, the support module 440 can include a depth control device, such as a horizontal hydroplane coupled to the support module 440. The support module 440 can include a depth sensor that is in communication with the depth control device. The horizontal hydroplane is discussed further in association with FIGS. 7-9B below.

Figure 5:
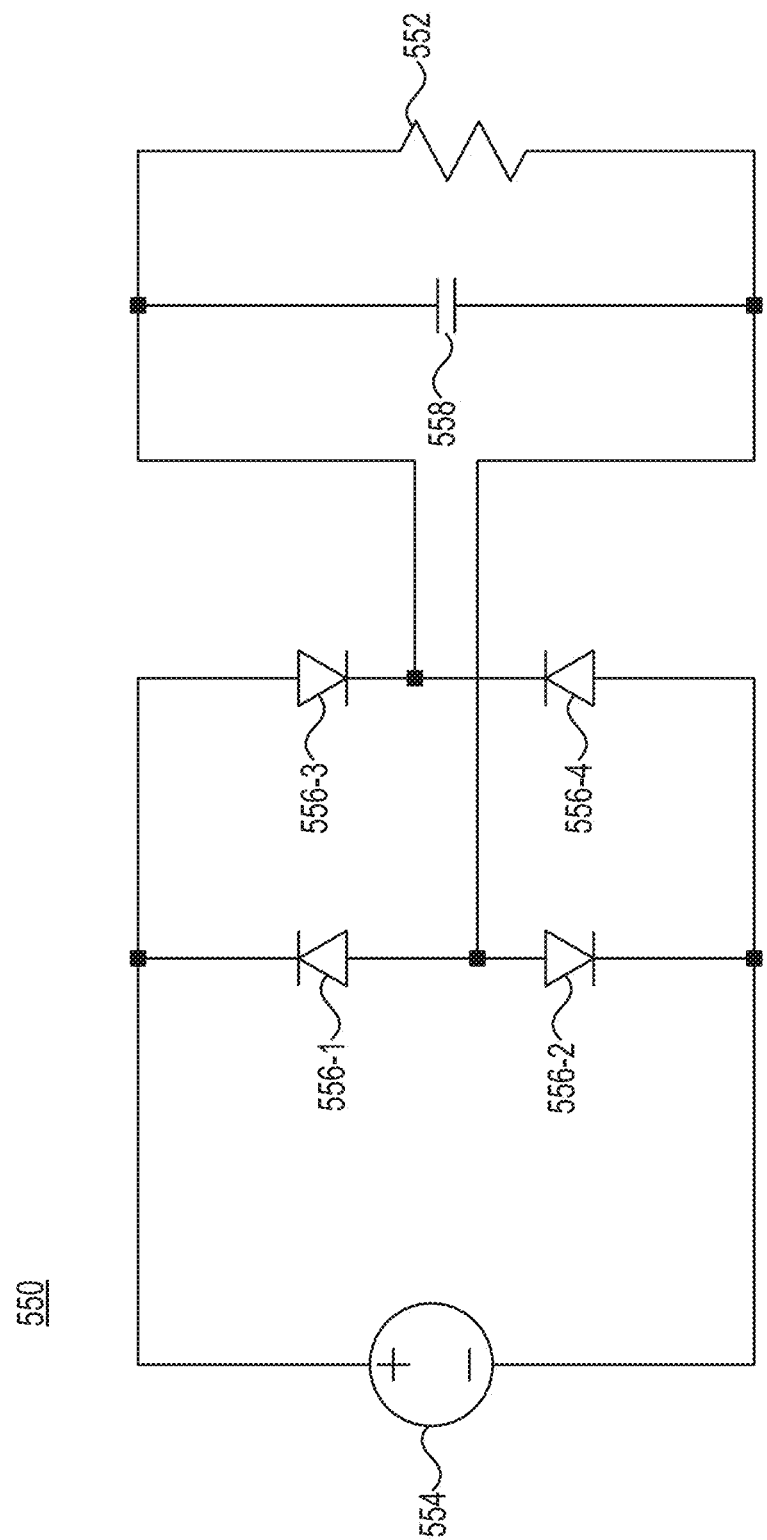
FIG. 5 illustrates an example of a circuit for converting switched direct current (DC) power to regulated DC power.

FIG. 5 illustrates an example of a circuit 550 for converting switched DC power to regulated DC power. In at least one embodiment, the support module, such as the support module 340 illustrated in FIG. 3, can include a circuit to convert switched DC power from a power supply, such as the power supply 328 illustrated in FIG. 3, to regulated DC power.

The circuit 550 can include a voltage source 554 that represents the voltage from the power supply from the marine survey vessel. The circuit 550 can include four diodes 556 that function as a rectifier circuit to convert an input to DC with spikes. A first terminal of a first diode 556-1 can be coupled to the positive terminal of the voltage source 554. A first terminal of a second diode 556-2 can be coupled to the negative terminal of the voltage source 554. A second terminal of the first diode 556-1 can be coupled to a second terminal of the second diode 556-2. A first terminal of the third diode 556-3 can be coupled to a first terminal of a fourth diode 556-4. A second terminal of a third diode 556-3 can be coupled to the first terminal of the first diode 556-1. A second terminal of the fourth diode 556-4 can be coupled to the first terminal of the second diode 556-2. The forward direction of the diodes 556 can be from their respective second terminals to their respective first terminals. As used herein, "forward direction of a diode" refers to the direction in which the diode allows an electric current to flow.

The circuit 550 can include a capacitor 558 that functions as a filter to remove the spikes resulting from operation of the rectifier circuit. A first terminal of the capacitor 558 can be coupled to the first terminal of the third diode 556-3 and the first terminal of the fourth diode 556-4. A second terminal of the capacitor 558 can be coupled to the second terminal of the first diode 556-1 and the second terminal of the second diode 556-2. For example, the capacitance of the capacitor 558 can be 200 microfarads. A resistor 552, which represents the load from the support electronics such as depth sensors, position control devices, position indicators, and hydroplanes, can be coupled in parallel to the capacitor 558. A first terminal of the resistor 552 can be coupled to the first terminal of the capacitor 558, the first terminal of the third diode 556-3, and the first terminal of the fourth diode 556-4. A second terminal of the resistor 552 can be coupled to the second terminal of the capacitor 558, the second terminal of the first diode 556-1, and the second terminal of the second diode 556-2. The capacitor 558 can filter the switched DC power from the voltage source 554 to provide regulated DC power across the resistor 552. The regulated DC power can be distributed other components and systems of towable EM source equipment, such as the towable EM source equipment 327 illustrated in FIG. 3. In at least one embodiment, a support module can include the circuit 550 to provide approximately 23 kW of regulated DC power at 480 V and 48 A across the resistor 552.

Figure 6:
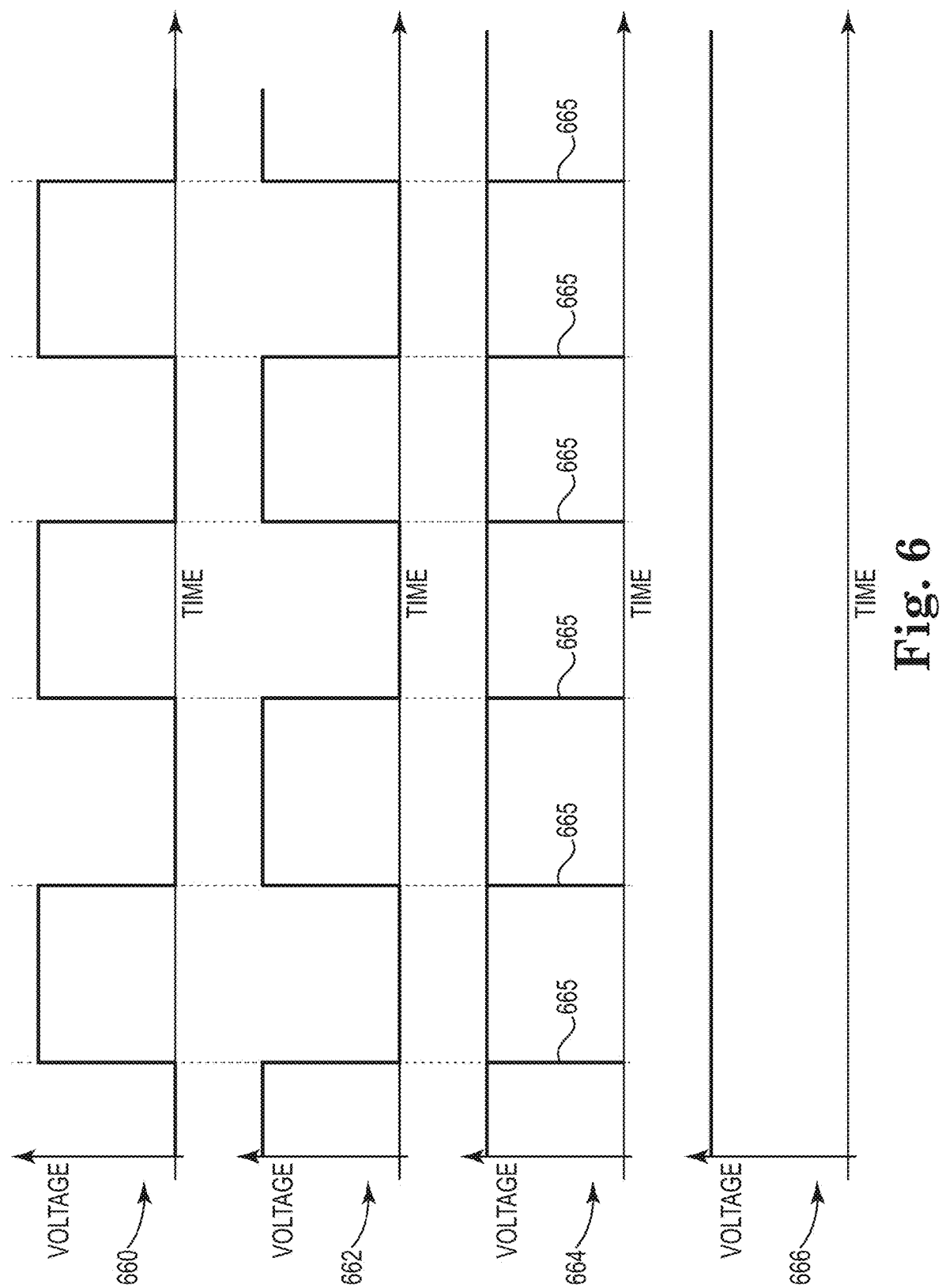
FIG. 6 illustrates graphs representing switched DC power and regulated DC power converted from the switched DC power.

FIG. 6 illustrates graphs representing switched DC power and regulated DC power converted from the switched DC power. In FIG. 6, the vertical axes represent voltage and the horizontal axes represent time. However, the origins of the horizontal axes may not represent zero volts. The first graph 660 shows the positively polarized switched DC power. The positively polarized switched DC power, in some instances, can follow a square wave that rises to a particular positive voltage and falls to a particular negative voltage. For example, the positively polarized switched DC power can rise to +240 V and fall to −240 V. However, the particular positive voltage and the particular negative voltage do not have to be the same magnitude. The first graph 660 can correspond to the positively polarized switched DC power. For example, the first graph 660 corresponds to the switched DC power distributed to a forward electrode of towable EM source equipment, such as the forward electrode 326-1 of the towable EM source equipment 327 illustrated in FIG. 3.

The second graph 662 shows the negatively polarized switched DC power. The negatively polarized switched DC power, in some instances, can follow a square wave. The negatively polarized switched DC power falls to the particular negative voltage when the positively polarized switched DC power shown in the second graph 662 rises to the particular positive voltage. The negatively polarized switched DC power rises to the particular positive voltage when the positively polarized switched DC power falls to the particular negative voltage. For example, the negatively polarized switched DC power can fall to −240 V when the positively polarized switched DC power rises to +240 V. Likewise, the negatively polarized switched DC power can rise to +240 V when the positively polarized switched DC power falls to −240 V. The second graph 662 corresponds to the switched DC power distributed to an aft electrode of towable EM source equipment, such as the aft electrode 326-2 of the towable EM source equipment 327 illustrated in FIG. 3. The first graph 660 and the second graph 662 correspond to the voltage supply 554 illustrated in FIG. 5.

The third graph 664 shows a rectified voltage of the positively polarized and negatively polarized switched DC power illustrated in the first graph 660 and the second graph 662. For example, the diodes 556 of the circuit 550 illustrated in FIG. 5 can rectify the positively polarized and negatively polarized switched DC power. The magnitude of the rectified voltage can be 480 V but as shown in the third graph 664, the rectified voltage includes spikes 665 corresponding to when the positively polarized and negatively polarized switched DC power change polarity. The polarity changes shown in the first graph 660 and the second graph 662 align with the spikes shown in the third graph 664.

The fourth graph 666 shows regulated DC power resulting from filtering the rectified voltage shown in the third graph 664. For example, the rectified voltage can be filtered by a capacitor, such as the capacitor 558 of the circuit 550 illustrated in FIG. 5. The regulated DC power can be, for example, linear irrespective of switching frequency of the input switched DC power. In at least one embodiment, the regulated DC power can be 480 V DC. The regulated DC power can be distributed to other components and systems of towable EM source equipment, such as the towable EM source equipment 327 illustrated in FIG. 3. The regulated DC power can be drawn across the resistor 552 of the circuit 550. Although not specifically illustrated in FIG. 6, the DC power can be stepped down for auxiliary instruments. For example, where the voltage in the graph 666 is 480 V, it can be stepped down to 24 V (or another suitable voltage for auxiliary equipment). The graph of such a stepped down voltage would appear the same as the graph 666, but with a lower magnitude of the voltage.

Figure 7:
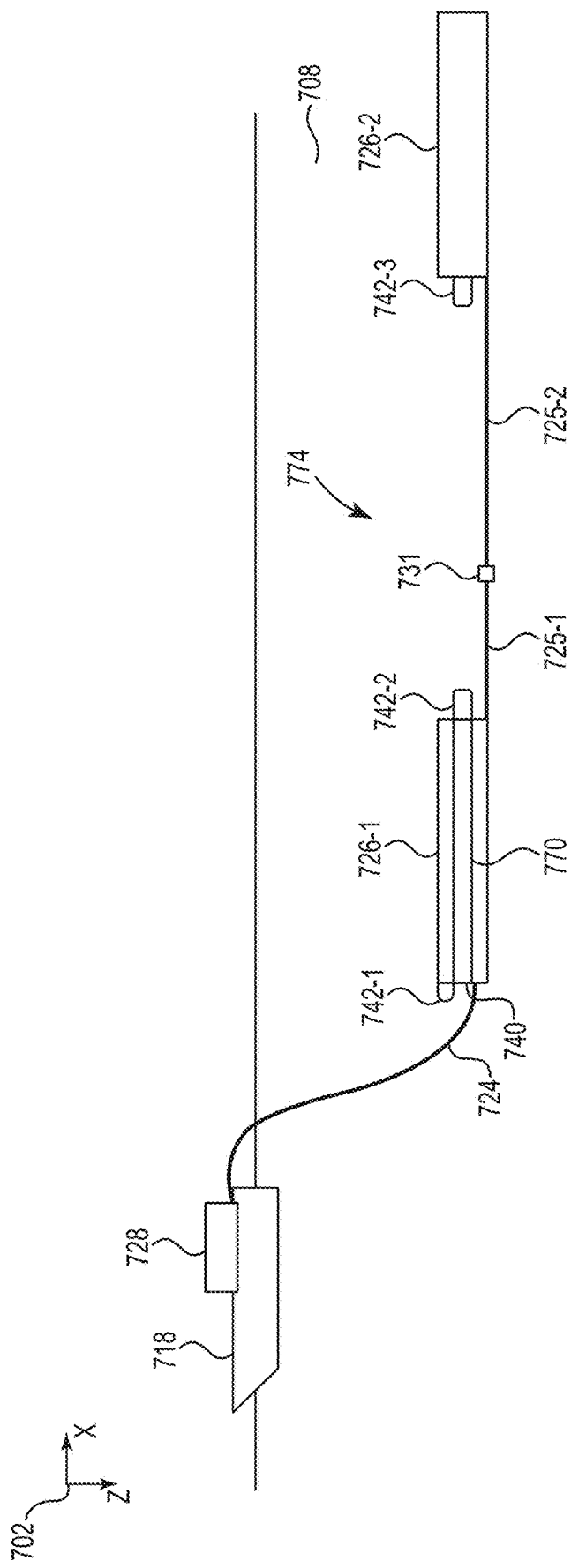
FIG. 7 is an xz-plane view of an example of towable EM source equipment including a support module that is internal to a forward electrode of the towable EM source equipment.

FIG. 7 is an xz-plane 702 view of an example of towable EM source equipment 774 including a support module 740 that is internal to a forward electrode 726-1 of the towable EM source equipment 774. The support module 740 can be coupled to a marine survey vessel 718 via a heavy cable 724. A power supply 728 onboard the marine survey vessel 718 can be coupled to the towable EM source equipment 774.

In at least one embodiment, the forward electrode can be a hollow cylinder. In the towable EM source equipment 327 illustrated in FIG. 3 and the towable EM source equipment 472 illustrated in FIG. 4 where the support module is coupled to the forward electrode, the support module is external to the forward electrode 326-1 or 426-1. In contrast, the embodiment illustrated in FIG. 7 takes advantage of the hollow space of the forward electrode 726-1 by having the support module 740 internal to the forward electrode 726-1. Having the support module 740 internal to the forward electrode 726-1 reduces the profile of the towable EM source equipment 774, which can reduce drag on the towable EM source equipment 774, making the towable EM source equipment 774 easier to tow through the water volume 708. Additionally, the towable EM source equipment can be towed at faster speeds, such as that associated with a marine seismic survey.

As illustrated in FIG. 7, a horizontal hydroplane 770 can be coupled to the forward electrode 726-1. The support module 740 can distribute power, including switched DC power or regulated DC power, to a mechanism, such as an actuator, motor, or electromechanical depressor, to change the angle of the horizontal hydroplane 770 relative to the support module 740. The support module 740 can include a depth sensor that is in communication with the mechanism. The horizontal hydroplane 770 is discussed further in association with FIGS. 8, 9A, 9B, and 9C below.

A first position indicator 742-1 can be coupled to the forward face of the support module 740 and directed towards the marine survey vessel 718. A second position indicator 742-2 can be coupled to the aft face of the support module 740. A third position indicator 742-3 can be coupled to the aft electrode 726-2 and directed towards the forward electrode 726-1. The aft electrode 726-2 can be coupled to the support module 740 via the second light cable section 725-2, the light cable interconnect 731, and via the first light cable section 725-1 being coupled to the aft face of the support module 740.

Figure 8:
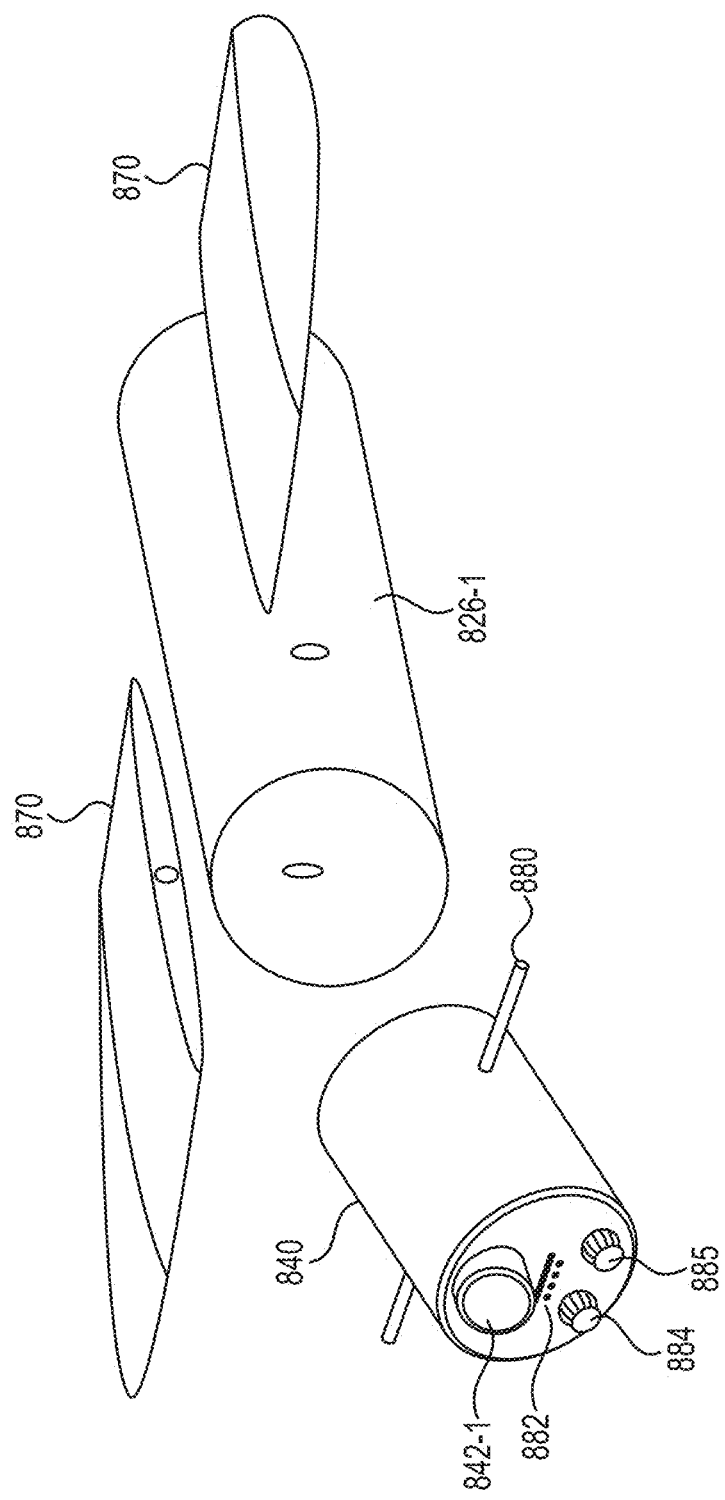
FIG. 8 is an exploded view of an example of towable EM source equipment including a support module that is to be placed internally to a forward electrode.

FIG. 8 is an exploded view of an example of towable EM source equipment including a support module 840 that is to be placed internally to a forward electrode 826-1. As illustrated in FIG. 8, the support module 840 can include a position indicator 842-1. The support module 840 can include a first interface 884 and a second interface 885 to receive DC power, such as switched DC power, from a power supply via two sub-cables split from a heavy cable. Each of the first interface 884 and the second interface 885 can include two respective connections for two respective leads from each of the sub-cables so as to provide a positive and negative potential difference that supplies power. The first interface 884 can distribute DC power to the support module 840 and/or to auxiliary equipment associated therewith. The second interface 885 can distribute DC power to an aft electrode via a light cable. The support module 840 can include a third interface 882 to distribute power, including switched DC power or regulated DC power, to auxiliary equipment. As used herein, "auxiliary equipment" refers to marine survey equipment other than electrodes of towable EM source equipment, seismic sources, EM receivers, and seismic receivers. For example, auxiliary equipment can include, but is not limited to, sensors, position indicators, and position control devices.

The support module 840 can include a control rod 880 to which a horizontal hydroplane 870 can be coupled. In at least one embodiment, the control rod 880 can be part of the support module 840 that is coupled to the horizontal hydroplane 870. In at least one embodiment, the control rod 880 can be part of the horizontal hydroplane 870 that is coupled to the support module 840. Although the horizontal hydroplane 870 includes two different hydroplanes on opposing sides of the forward electrode 826-1, it is referred to collectively herein as a single object because both of the horizontal hydroplanes can be controlled together by operation of the control rod 880. The forward electrode 826-1 can include apertures through which the control rod 880 can pass. Although not illustrated in FIG. 8, the support module 840 or the horizontal hydroplane 870 can include a mechanism, such as an actuator, motor, or electromechanical depressor, coupled to the control rod 880 to change the angle of the horizontal hydroplane 870 relative to the support module 840. The support module 840 can include a depth sensor that is in communication with the mechanism. The support module 840 can distribute switched DC power from the power supply, or regulated DC power converted from the switched DC power, to the mechanism.

The horizontal hydroplane 870 can cause a downward force to be applied the forward electrode 826-1. The horizontal hydroplane 870 can be large and have a large surface area. Increasing the surface area of the horizontal hydroplane 870 can increase the magnitude of the downward force. Increasing the surface area of the horizontal hydroplane 870 can increase the amount of power necessary to change the angle of the horizontal hydroplane 870. However, as discussed above, a power supply generates a significant amount of power such that there may be excess power that can be distributed by the support module 840 to power a mechanism that changes the angle of the horizontal hydroplane 870. The downward force can supplement the depth control provided by a heavy cable coupled to the support module 840. The heavy cable can provide coarse control of depth as compared to the horizontal hydroplane 870. Specifically, the heavy cable can provide layback and the weight of the heavy cable and the forward electrode 826-1 and/or support module 840 can provide coarse control of depth while the horizontal hydroplane 870 can maintain the depth or provide fine depth control. The support module 840, via the mechanism coupled to the control rod 880, can provide fine depth control by adjusting the angle of the horizontal hydroplane 870 on the fly. The support module 840, via the mechanism coupled to the control rod 880, can maintain a particular depth of the towable EM source equipment by adjusting the angle of the horizontal hydroplane 870 on the fly. The angle of the horizontal hydroplane 870 can be changed on the fly in response to currents and motion from the marine survey vessel that tows the towable EM source equipment.

Adjusting the depth of the towable EM source equipment via adjusting the angle of the horizontal hydroplane 870 can adjust the layback of the towable EM source equipment. Control of layback can be important in preventing entanglement of cables associated with the towable EM source equipment with cables associated with marine seismic survey equipment.

The light cable coupled to the forward electrode 826-1 and an aft electrode can maintain the aft electrode at a position level with the forward electrode 826-1. Thus, a change in the angle of the horizontal hydroplane 870 that affects depth of the forward electrode will be reflected in the depth of the aft electrode such that another horizontal hydroplane coupled to the aft electrode is not needed. Coupling the horizontal hydroplane 870 to the forward electrode 826-1 can eliminate the need for towable EM source equipment to include other position control devices, such as the position control devices 444 illustrated in FIG. 4, to control the depth of the towable EM source equipment. However, embodiments including both a horizontal hydroplane 870 coupled to the forward electrode 826-1 and position control devices coupled to the light cable are possible, for example, when an even finer level of depth control is desired.

Although not illustrated in FIG. 8, a vertical hydroplane can be coupled to the forward electrode 826-1 and the support module 840 via another control rod. The vertical hydroplane can be used to change and maintain the lateral (cross-line) position of the towable EM source equipment by changing the angle of the vertical hydroplane. The light cable coupled to the forward electrode 826-1 and the aft electrode ensures that the aft electrode is in line with the forward electrode 826-1. Thus, changing the angle of the vertical hydroplane can change and maintain the lateral position of the aft electrode without another vertical hydroplane coupled to the aft electrode. In at least one embodiment, a vertical hydroplane can be coupled to the forward electrode 826-1 rather than using other position control devices, such as the position control devices 444 illustrated in FIG. 4, to control the lateral position of the towable EM source equipment. However, embodiments including both a vertical hydroplane coupled to the forward electrode 826-1 and position control devices coupled to the light cable are possible, for example, when an even finer level of position control is desired.

Figure 9C:
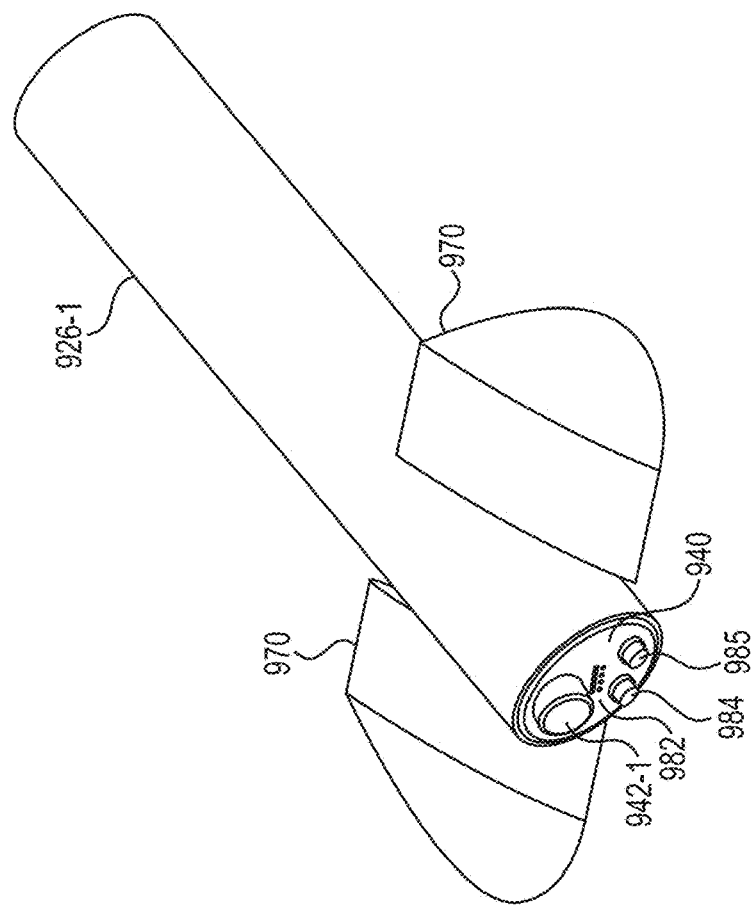
FIG. 9C is an isometric view of an example of a portion of towable EM source equipment including a support module that is internal to a forward electrode.
Figure 9A:
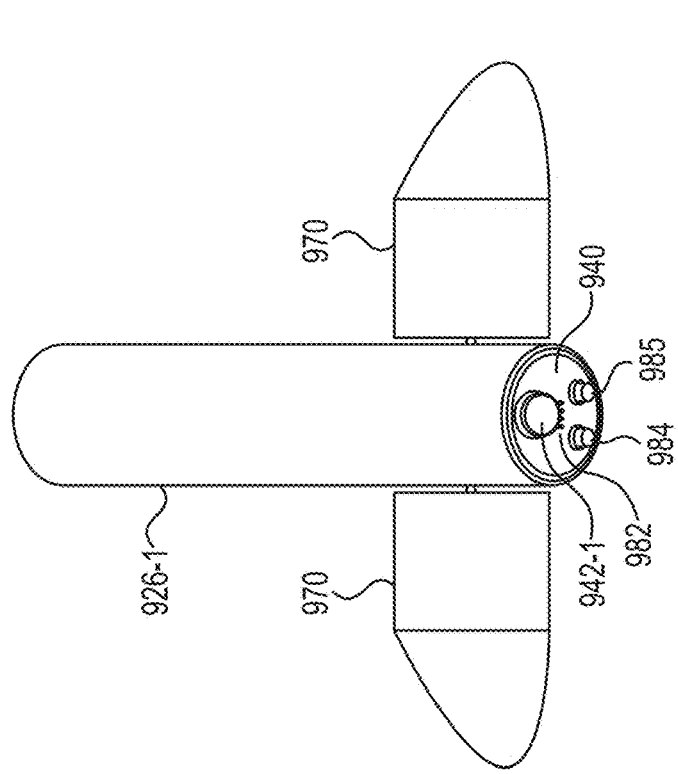
FIG. 9A is a plan view of an example of a portion of towable EM source equipment including a support module that is internal to a forward electrode.

FIG. 9A is a plan view of an example of a portion of towable EM source equipment including a support module 940 that is internal to a forward electrode 926-1. A horizontal hydroplane 970 is coupled to the forward electrode 926-1 and the support module 940. Also illustrated are the first position indicator 942-1, the first interface 984, the second interface 985, and the third interface 982.

Figure 9B:
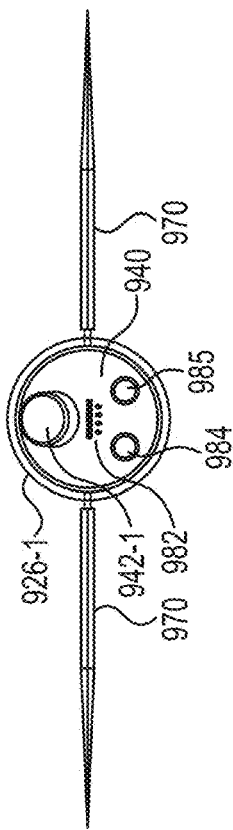
FIG. 9B is an end view of an example of a portion of towable EM source equipment including a support module that is internal to a forward electrode.

FIG. 9B is an end view of an example of a portion of towable EM source equipment including a support module 940 that is internal to a forward electrode 926-1. A horizontal hydroplane 970 is coupled to the forward electrode 926-1 and the support module 940. Also illustrated are the first position indicator 942-1, the first interface 984, the second interface 985, and the third interface 982.

FIG. 9C is an isometric view of an example of a portion of towable EM source equipment including a support module 940 that is internal to a forward electrode 926-1. Also illustrated are the first position indicator 942-1, the first interface 984, the second interface 985, and the third interface 982. In FIG. 9C, the horizontal hydroplane 970 is angled down (the front of the forward electrode 926-1 is on the left as illustrated in FIG. 9C). Such an angle of the horizontal hydroplane 970 can cause the towable EM source equipment to travel to a deeper depth.

Figure 10:
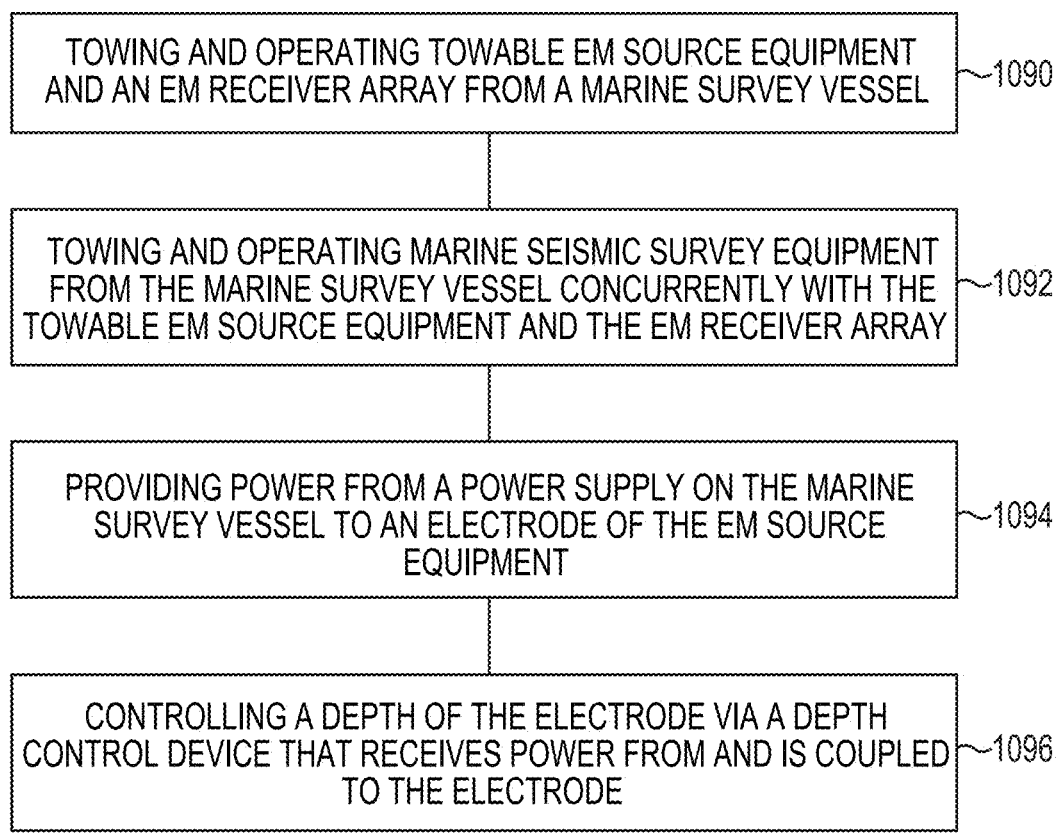
FIG. 10 illustrates an example of a method of performing a towed EM survey.

FIG. 10 illustrates an example of a method for a marine seismic survey. The method can comprise, at block 1090, towing and operating towable EM source equipment and an EM receiver array from a marine survey vessel. At block 1092, the method can include towing and operating marine seismic survey equipment from the marine survey vessel concurrently with the towable EM source equipment and the EM receiver array. At block 1094, the method can include providing power from a power supply on the marine survey vessel to an electrode of the EM source equipment. At block 1096, the method can include controlling a depth of the electrode via a depth control device that receives power from and is coupled to the electrode.

Providing power from the power supply can comprise providing switched DC power from a DC power supply on the marine survey vessel. The switched DC power can be converted to regulated DC power via a support module coupled to the electrode. The regulated DC power can be distributed to the depth control device. The towable EM source equipment can be towed at a marine survey vessel speed associated with a marine seismic survey, such as a marine seismic survey. The towable EM source equipment is towed at a depth between 10 and 500 meters.

In accordance with a number of embodiments of the present disclosure, a geophysical data product may be produced. The geophysical data product may include, for example, field data recorded during a survey utilizing the above-described techniques. Geophysical data may be obtained and stored on a non-transitory, tangible computer-readable medium. In some instances, geophysical analysis may be performed on the geophysical data product offshore according to techniques described herein or known in the art, and stored on a computer-readable medium, to produce an enhanced geophysical data product.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A marine survey system, comprising:
    a negatively buoyant first cable including a first end configured to be coupled to a switched direct current (DC) power supply on a marine survey vessel and configured to provide coarse depth control of EM source equipment;
    a first electrode of the electromagnetic (EM) source equipment;
    a support module internal to the first electrode and coupled to a second end of the first cable;
    a depth control device coupled to the first electrode and configured to provide fine control of a depth of the first electrode;
    a first end of a neutrally buoyant second cable coupled to the support module; and
    a second electrode of the EM source equipment coupled to a second end of the second cable; and
    wherein the support module includes a circuit configured to convert switched DC power to regulated DC power and wherein the support module is configured to:
        receive switched DC power from the first cable; and
        provide switched DC power to the first electrode and, via the second cable, to the second electrode; and
        distribute regulated DC power to the depth control device.

2. The marine survey system of claim 1, wherein the depth control device includes a horizontal hydroplane to control a depth of the first electrode.

3. The marine survey system of claim 2, wherein the depth control device includes a mechanism coupled to the horizontal hydroplane and configured to receive regulated DC power from the support module to adjust an angle of the horizontal hydroplane.

4. The marine survey system of claim 3, wherein the depth control device includes a vertical hydroplane to control a lateral position of the first electrode.

5. The marine survey system of claim 4, wherein the depth control device includes a different mechanism coupled to the vertical hydroplane, wherein the different mechanism is configured to receive regulated DC power from the support module to adjust an angle of the vertical hydroplane relative to the support module.

6. The marine survey system of claim 1, wherein the support module is further configured to distribute regulated DC power to one or more of sensors, position indicators, and position control devices.

7. The marine survey system of claim 1, wherein the first electrode and the second electrode comprise a horizontal dipole source.

8. The marine survey system of claim 1, wherein no position control devices are coupled to the second cable.

9. The marine survey system of claim 1, wherein the support module includes a position indicator, wherein the position indicator is configured to receive regulated DC power from the support module.

10. The marine survey system of claim 1, wherein the support module includes:
    a first position indicator coupled to the support module to determine a position of the first electrode relative to the marine survey vessel; and a second position indicator coupled to the support module to determine a position of the second electrode relative to the first electrode,
wherein the first position indicator and the second position indicator are configured to receive regulated DC power from the support module.

11. The marine survey system of claim 1, wherein the support module includes an interface configured to distribute the regulated DC power to auxiliary equipment.

12. The marine survey system of claim 1, wherein a position control device is coupled to the second cable, wherein the position control device is battery powered such that the position control device does not receive power from the support module.

13. The marine survey system of claim 12, wherein the support module includes a position indicator configured to:
   determine a position of the position control device relative to the support module; and
   receive regulated DC power from the support module.

14. The marine survey system of claim 1, wherein the support module is configured to:
   provide a first portion of the power received by the support module via the first cable to the first electrode;
   provide a second portion of the power received by the support module via the first cable to operate the depth control device; and
   provide a third portion of the power received by the support module via the first cable to the second electrode via the second cable.

15. A method of performing a towed electromagnetic (EM) survey, comprising:
   towing and operating EM source equipment from a marine survey vessel with a negatively buoyant cable to provide coarse depth control of the EM source equipment;
   towing an EM receiver array from the marine survey vessel;
   towing and operating marine seismic survey equipment from the marine survey vessel concurrently with the EM source equipment and the EM receiver array;
   providing switched direct current (DC) power from a power supply on the marine survey vessel to a support module internal to a first electrode of the EM source equipment;
   providing, via the support module, switched DC power to the first electrode;
   providing, via the support module and a neutrally buoyant second cable, switched DC power to a second electrode of the EM source equipment;
   converting, via a circuit of the support module, switched DC power to regulated DC power;
   distributing, via the support module, regulated DC power to a depth control device coupled to the first electrode; and
   providing fine depth control of the first electrode via the depth control device.

16. The method of claim 15, further comprising towing the EM source equipment at a marine survey vessel speed associated with a marine seismic survey.

17. The method of claim 16, further comprising towing the EM source equipment at a depth between 10 and 500 meters.

18. A method of performing a towed electromagnetic (EM) survey, comprising:
   towing and operating EM source equipment from a marine survey vessel with a negatively buoyant cable to provide coarse depth control of the EM source equipment; towing an EM receiver array from the marine survey vessel;
   towing and operating marine seismic survey equipment from the marine survey vessel concurrently with the EM source equipment and the EM receiver array;
   providing switched direct current (DC) power from a power supply on the marine survey vessel to a support module internal to a first electrode of the EM source equipment;
   providing, via the support module, a first portion of the switched DC power from the power supply to the first electrode;
   converting, via a circuit of the support module, a second portion of the switched DC power to regulated DC power;
   distributing, via the support module, the regulated DC power to a depth control device coupled to the first electrode to provide fine depth control of the first electrode; and
   providing, via the support module and a neutrally buoyant second cable, a third portion of the switched DC power to a second electrode of the EM source equipment.

19. The method of claim 18, wherein distributing the regulated DC power further comprises distributing the regulated DC power to at least one of a group of devices including a position control device, a position indicator, a vertical hydroplane, and a sensor.

20. A method to manufacture a geophysical data product, the method comprising:
   obtaining geophysical data from a marine survey, wherein the marine survey includes:
      towing and operating EM source equipment from a marine survey vessel with a negatively buoyant cable to provide coarse depth control of the EM source equipment;
      towing an EM receiver array from the marine survey vessel;
      towing and operating marine seismic survey equipment from the marine survey vessel concurrently with the EM source equipment and the EM receiver array;
      providing switched direct current (DC) power from a power supply on the marine survey vessel to a support module internal to a first electrode of the EM source equipment;
      providing, via the support module, switched DC power from the power supply to the first electrode;
      providing, via the support module and a neutrally buoyant second cable, switched DC power to a second electrode of the EM source equipment;
      converting, via a circuit of the support module, switched DC power to regulated DC power;
      distributing, via the support module, regulated DC power to a depth control device coupled to the first electrode; and
      providing fine depth control of the first electrode via the depth control device;
   processing the geophysical data to generate the geophysical data product; and
   recording the geophysical data product on a non-transitory machine-readable medium.

21. The method of claim 20, wherein processing the geophysical data comprises processing the geophysical data offshore or onshore.

* * * * *